United States Patent
Cui et al.

(10) Patent No.: US 11,073,829 B1
(45) Date of Patent: Jul. 27, 2021

(54) TRANSPARENT ELEMENT DETECTION FOR VEHICLES

(71) Applicant: Amazon Technologies, Inc., Seattle, WA (US)

(72) Inventors: Chengwu Cui, Redmond, WA (US); Sarah Graber, Seattle, WA (US); Joshua John Watson, Seattle, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 328 days.

(21) Appl. No.: 16/297,322

(22) Filed: Mar. 8, 2019

Related U.S. Application Data

(62) Division of application No. 15/272,152, filed on Sep. 21, 2016, now Pat. No. 10,281,916.

(51) Int. Cl.
*G05D 1/00* (2006.01)
*G05D 1/10* (2006.01)
*G05D 1/02* (2020.01)
*G06T 7/00* (2017.01)

(52) U.S. Cl.
CPC ......... *G05D 1/0088* (2013.01); *G05D 1/0223* (2013.01); *G05D 1/0246* (2013.01); *G05D 1/101* (2013.01); *G06T 2207/10048* (2013.01)

(58) Field of Classification Search
None
See application file for complete search history.

(56) References Cited

U.S. PATENT DOCUMENTS

| 9,476,980 B2 | 10/2016 | Thayer et al. |
| 10,196,141 B1 | 2/2019 | Cui et al. |
| 2005/0035926 A1* | 2/2005 | Takenaga ............ B60S 1/0844 345/8 |
| 2007/0040446 A1 | 2/2007 | Hamm |
| 2013/0123985 A1 | 5/2013 | Hirai et al. |
| 2014/0146303 A1 | 5/2014 | Mitchell et al. |
| 2016/0082460 A1 | 3/2016 | Mcmaster et al. |
| 2017/0103270 A1 | 4/2017 | Reiff et al. |
| 2017/0115208 A1 | 4/2017 | Ichihashi |

OTHER PUBLICATIONS

"U.S. Appl. No. 15/272,128", Detection of Transparent Elements Using Reflective Disparities, filed Sep. 21, 2016.
U.S. Appl. No. 15/272,152 , "Non Final Office Action", dated Aug 10, 2018, 16 pages.

(Continued)

*Primary Examiner* — Todd Melton
*Assistant Examiner* — Jason R Roberson
(74) *Attorney, Agent, or Firm* — Kilpatrick Townsend & Stockton LLP

(57) ABSTRACT

A system for detecting transparent elements in a vehicle environment are described. In some examples, this may include accessing an image of a scene captured by an image capture device attached to a vehicle. A reflected image present in the image may be detected. The reflected image may include a portion of the vehicle. It may be determined that the scene includes a transparent element based at least in part on detecting the reflected image present in the image.

20 Claims, 12 Drawing Sheets

(56) References Cited

OTHER PUBLICATIONS

U.S. Appl. No. 15/272,152 , "Notice of Allowance", dated Jan. 3, 2019, 10 pages.
U.S. Appl. No. 15/272,152 , "Restriction Requirement", dated May 23, 2018, 6 Pages.
"U.S. Appl. No. 15/272,152", Detection of Transparent Elements Using Specular Reflection, filed Sep. 21, 2016.
Haikonen , "Reflections of Consciousness: The Mirror Test", AAAI Fall Symposium on Consciousness and Artificial Intelligence, 2007, pp. 67-71.
Miyazaki et al., "Determining Shapes of Transparent Objects from Two Polarization Images", Proceedings of IAPR Workshop on Machine Vision Applications, 2002, pp. 26-31.

\* cited by examiner

TRANSPARENT ELEMENT DETECTION FOR VEHICLES

CROSS REFERENCE TO RELATED APPLICATIONS

This application is a Divisional of U.S. application Ser. No. 15/272,152, filed Sep. 21, 2016, and titled "DETECTION OF TRANSPARENT ELEMENTS USING SPECULAR REFLECTION" the contents of which are herein incorporated in its entirety.

BACKGROUND

The use of unmanned aerial vehicles (UAVs) for personal and commercial use continues to grow. Some UAVs may be controlled by a human operator with a remote control.

Other UAVs may include control software, which is some cases, may enable these UAVs to operate autonomously or semi-autonomously. Using sensors on the UAV, this control software may provide a sense and avoid system that senses objects and generates instructions for a propulsion system to avoid collisions.

BRIEF DESCRIPTION OF THE DRAWINGS

Various embodiments in accordance with the present disclosure will be described with reference to the drawings, in which.

DETAILED DESCRIPTION

Figure 1:
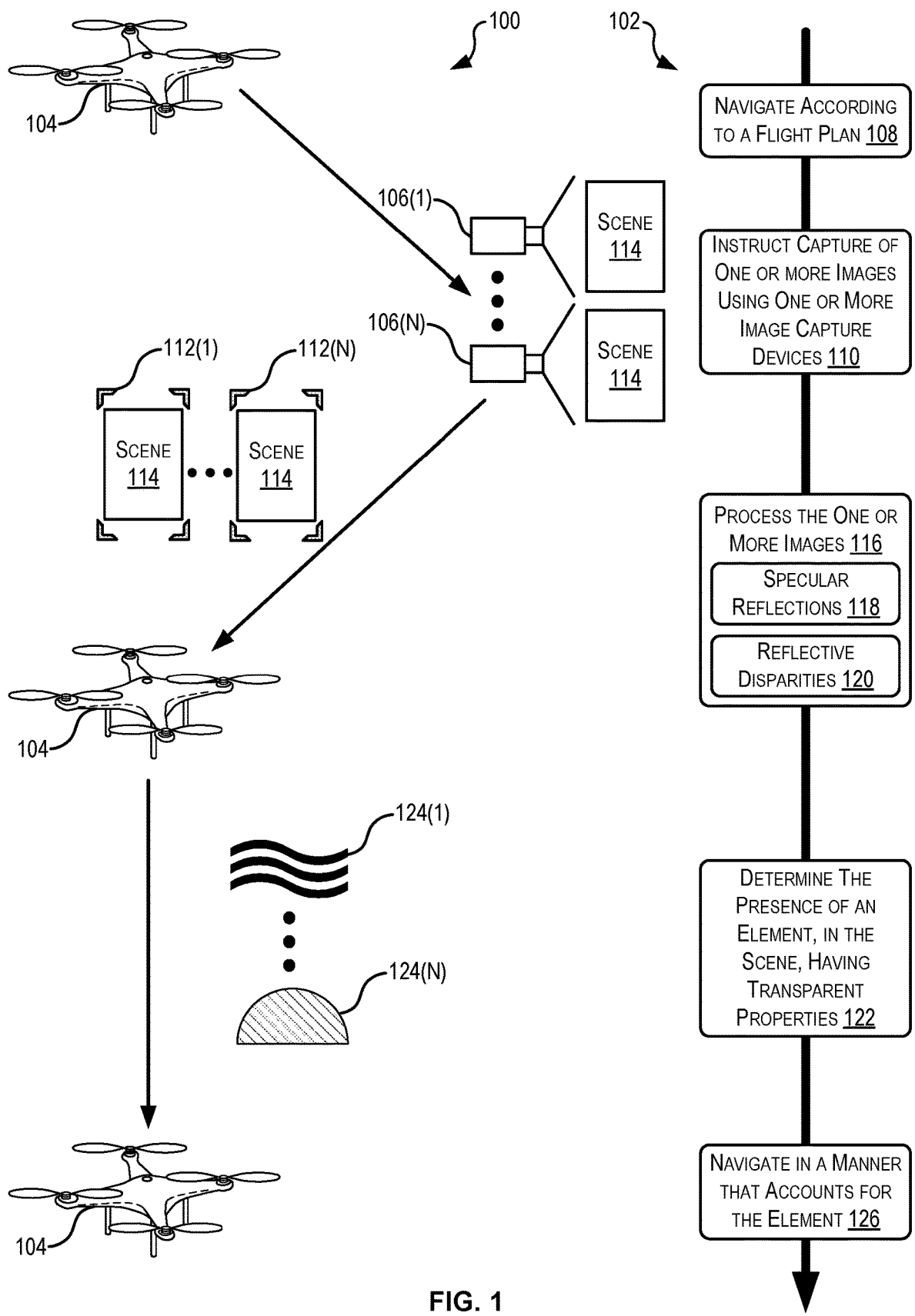
FIG. 1 is an example diagram depicting an example flow for detecting transparent elements in a UAV environment, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, techniques relating to detecting transparent elements in a UAV environment. In particular, the techniques described herein may utilize computer vision techniques to detect certain elements of a scene (e.g., objects, obstacles, substances, surfaces, etc.) that have transparent properties and surround a UAV. Using information about the presence of these transparent elements in the scene, the UAV can navigate accordingly. For example, the UAV can identify a body of water—a type of transparent element, decide to avoid the water, and therefore navigate around the body of water.

The techniques described herein may identify transparent elements that previously were undetectable or otherwise difficult to detect by existing systems. This may improve the function of existing UAVs by reducing the overall weight of the UAVs. This may be achieved by eliminating certain redundant navigational devices typically used for object detection (e.g., Sound Navigation and Ranging (SONAR) systems, Radio Detection and Ranging (RADAR) systems, etc.). In some examples, these devices are still included on the UAV described herein.

Turning now to a particular example, in this example, a UAV is outfitted with an image capture device such as a camera. As the UAV is flying, the camera can capture images of a scene surrounding the UAV (e.g., below, above, in front, behind, to the sides, etc.). A computer in communication with the UAV (e.g., an onboard computer or a remote computer) can analyze the images to search for certain features associated with transparent elements. For example, as transparent elements often exhibit reflective properties, the computer can analyze the images to detect the presence of a reflections in the images. The reflection may then be further analyzed to determine whether the reflection includes certain objects. For example, the reflection may be analyzed to determine whether it includes a portion of the UAV (e.g., an underside of the UAV) or a unique pattern of lights (e.g., projected from the UAV). In this manner, the UAV may classify certain pixels and/or the entire image as including a transparent element (e.g., water, ice, glass, mirror, etc.). The UAV may then navigate in a manner that is considerate of the transparent element.

Turning now to another particular example, in this example, a UAV is outfitted with a set of image capture devices such as cameras. As the UAV is flying, the cameras can capture images of the scene surrounding the UAV (e.g., below, above, in front, behind, to the sides, etc.). The cameras can include polarization filters to produce images having different polarization characteristics (e.g., polarization direction(s) of light excluded and/or included). A computer in communication with the UAV (e.g., an onboard computer or a remote computer) can analyze the images to identify differences in the images as a result of the different polarization characteristics (e.g., different degrees of "glare"). For example, when glare is removed from a first image including a watery scene (e.g., by using a first polarization filter), certain differences with respect to a second image may be identified. These differences can include texture (e.g., information about the spatial arrangement of color or intensities in an image or a selected region of an image), differences in brightness (e.g., certain colors in the first image may appear brighter as compared to the second image), and/or differences in features (e.g., objects below the water may stand out in the first image and be invisible in the second image). In this manner, the UAV may classify certain pixels and/or the entire image as including a transparent element (e.g., water, ice, glass, mirror, etc.). The UAV may then navigate in a manner that is considerate of the transparent element.

Turning now to the figures, FIG. 1 illustrates a simplified diagram 100 and an example process 102 for detecting transparent elements in a UAV environment, according to at least one example. The diagram 100 depicts examples states that correspond to the blocks in the process flow 102. The diagram 100 includes a UAV 104 that performs at least a portion of the process 102. In some examples, a remote computing device in communication with the UAV 104 performs at least a portion of the process 102. The UAV 104 includes one or more image capture devices 106(1)-106(N). The image capture devices 106 may be configured to capture images of an area surrounding the UAV 104. For example, the image capture devices 106 may capture images of an area below the UAV 104, above the UAV 104, in front of the UAV 104, behind the UAV 104, and/or to the side of the UAV 104. As the UAV 104 may be enabled with multi-directional flight, the image capture devices 106 may capture images in any direction of travel of the UAV 104. As described herein, the UAV 104 may also include other sensors, devices, and the like in addition to the image capture devices 106. For example, the UAV 104 may include a light projection device.

The process 102 begins at 108 by navigating according to a flight plan. For example, the flight plan may be associated with delivery of a package corresponding to a customer order. In this example, the UAV 104 may receive the flight plan, navigate according to the flight plan to a delivery location (e.g., a customer address), and deliver the package. In some examples, navigating according to the flight plan simply includes the UAV 104 being in the air and flying.

At 110, the process 102 instructs capture of one or more images 112(1)-112(N) using the one or more image capture devices 106. The one or more images 112 may depict a scene 114. In some examples, the one or more images 112 are captured at substantially the same time. In other examples, the one or more images 112 are captured as a sequence of images each depicting a slightly different view of the scene 114.

In any event, at 116, the process 102 processes the one or more images 112. This can include using one or more image processing techniques to identify objects and/or characteristics of the one or more images 112. In some examples, the processing at 116 may reveal certain specular reflections 118 present in the one or more images 112. These specular reflections may be instances of light reflected specularly from an element present in the scene 114. The processing at 116 may also reveal certain reflective disparities 120 present in the one or more images 112. These reflective disparities 120 may be identified by comparing images having different polarization characteristics (e.g., direction of polarized light present and/or filtered from the image, degree of polarization, etc.). For example, the one or more image capture devices 106 may utilize polarization filters when capturing the one or more images 112 of the scene 114.

At 122, the process 102 determines the presence of an element, in the scene, having transparent properties. This may be based on the processing performed at 116. For example, the processing at 116 may identify object and/or characteristics of the one or more images 112 that can be relied upon to infer or otherwise determine that the scene 114 includes such elements having transparent properties 124(1)-124(N). The element 124(1) represents a liquid element such as water that has transparent properties. The element 124(N) represents a solid element such a glass window that has transparent properties. In some examples, the process 102 also classifies each pixel of an image as including the element 124 or not. Thus, in some examples, only a portion of the scene 114 depicted in the image 112 includes the element 124 (e.g., an image of a backyard that depicts a patio and a swimming pool). In other examples, the entirety of the scene 114 depicted in the image 112 has transparent properties (e.g., an image that depicts only a lake over which the UAV 104 is flying). As described herein, transparent elements (e.g., elements having transparent properties) include elements that are capable of producing specular reflections. In some examples, the transparent elements may have different degrees of transparency or opacity. For example, some elements may be considered transparent for purposes of this description even though some light is scattered as the light passes through the elements (e.g., a glass). This may depend on the wavelength of light (e.g., transparent in the visual range, while opaque to ultraviolent light). Other elements may be considered transparent even though all light is reflected specularly (e.g., a mirror). Thus, in some examples, the "transparent" elements may have some properties similar to opaque elements, to purely transparent elements, to translucent elements, and to other elements exhibiting specular reflective properties. However, there are real advantages to using the techniques described herein on elements that are completely transparent or have low opacity (e.g., water) because these elements may otherwise be incapable of detection using conventional computer vision techniques.

At 126, the process 102 navigates in a manner that accounts for the element 124. For example, in the example including the patio and the swimming pool, the UAV 104 may use the information generated about the water in the swimming pool to avoid dropping (e.g., delivering) a package into the pool. As an additional example, in the example including the lake, the UAV 104 may use the information generated about the lake to map the location of lake or to land in the lake in the event the UAV 104 has been compromised.

Figure 2:
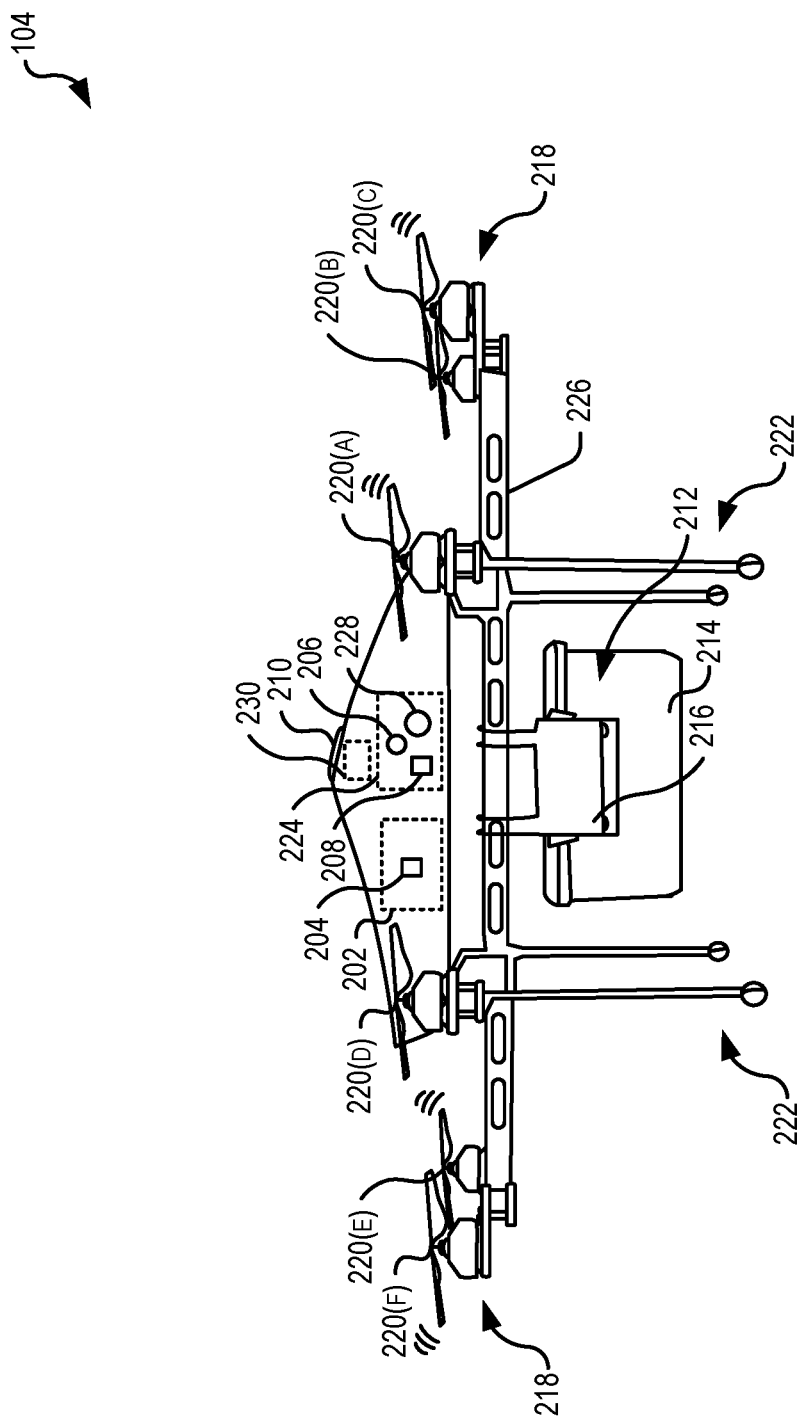
FIG. 2 is an example UAV for implementing techniques relating to detecting transparent elements in a UAV environment, according to at least one example.

FIG. 2 illustrates the UAV 104 for implementing techniques relating to detecting transparent elements in a UAV environment, according to at least one example. The UAV 104 may be designed in accordance with commercial aviation standards and may include multiple redundancies to ensure reliability. For purposes of this specification, the UAV 104 may include a plurality of systems or subsystems operating under the control of, or at least partly under the control of, a management system 202. The management system 202 may include a UAV management device 204 (e.g., an onboard computer) for autonomously or semi-autonomously controlling and managing the UAV 104 and, in some examples, for enabling remote control by a pilot. The UAV management device 204 will be discussed in more detail with reference to FIG. 3. Portions of the management system 202, including the UAV management device 204, may be housed under top cover 210. As used herein, the management system 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 104 and detecting objects) (not shown), radio-frequency identification (RFID) capability (not shown), and interfaces capable of speech interpretation and recognition (not shown).

The UAV 104 may also include a communication system 224 housed within the top cover 210. The communication system 224 may include one or more light sensors 228 (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors 206 (e.g., microphone, noise filters, and other sensors for capturing sound), and one or more output devices 208 (e.g., microphone, speaker, laser projector, light projector, and other devices for outputting communication information). In some examples, the light sensors 228 include one or more image capture devices. The image capture devices may be attached to the frame 226 of the UAV 104 via one or more pivoted support devices such as a gimbal. In some examples, a first image capture device is attached to the frame or a first pivot support device and a second image capture device is attached to the frame or a second pivot support device. The management system 202 may be configured to receive information and provide information via components of the communication system 224. For example, the UAV 104 may support two-way communication with operators. Two-way communication may be beneficial for verifying operators' identities that interact with the UAV 104, for posing questions to operators, and for providing instructions to operators. In some examples, the communication system 224 may operate semi-autonomously or autonomously.

As shown in FIG. 2, the UAV 104 may also include a retaining system 212. The retaining system 212 may be configured to retain payload 214. In some examples, the retaining system 212 may retain the payload 214 using friction, vacuum suction, opposing arms, magnets, and other retaining methods. As illustrated in FIG. 2, the retaining system 212 may include two opposing arms 216 (only one is illustrated) configured to retain the payload 214. The UAV management device 204 may be configured to control at least a portion of the retaining system 212. In some examples, the retaining system 212 may be configured to release the payload 214 in one of a variety of ways. For example, the retaining system 212 (or other system of the UAV 104) may be configured to release the payload 214 with a winch and spool system, by the retaining system 212 releasing the payload, and other methods of releasing the payload. In some examples, the retaining system 212 may operate semi-autonomously or autonomously.

In FIG. 2, the payload 214 is illustrated as a delivery box. In some examples, the delivery box may include one or more packages or items intended for delivery to a recipient. The payload 214, whether as a delivery box or otherwise, may be configured for delivery using a variety of different methods. For example, the payload 214 may include a parachute that opens and slows the payload's 214 descent as it falls to its delivery location. In some examples, the payload 214 may include padding surrounding its package to reduce the impact of a drop from the UAV 104 above the ground. The UAV 104 may also deliver the payload 214 by fully landing on the ground and releasing the retaining system 212.

Further, the UAV 104 may a include propulsion system 218. In some examples, the propulsion system 218 may include rotary blades or otherwise be a propeller-based system. As illustrated in FIG. 2, the propulsion system 218 may include a plurality of propulsion devices, a few of which, 220(A)-220(F), are shown in this view. Each propulsion device may include one or more propellers, a motor, wiring, a balance system, a control mechanism, and other features to enable flight. In some examples, the propulsion system 218 may operate at least partially under the control of the UAV management device 204. In some examples, the propulsion system 218 may be configured to adjust itself without receiving instructions from the UAV management device 204. Thus, the propulsion system 218 may operate semi-autonomously or autonomously. The propulsion system 218 may enable multi-directional flight of the UAV 104 (e.g., by adjusting each propulsion device individually).

The UAV 104 may also include a landing structure 222. The landing structure 222 may be adequately rigid to support the UAV 104 and the payload 214. The landing structure 222 may include a plurality of elongated legs which may enable the UAV 104 to land on and take off from a variety of different surfaces. The plurality of systems, subsystems, and structures of the UAV 104 may be connected via frame 226. The frame 226 may be constructed of a rigid material and be capable of receiving, via different connections, the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226.

The UAV 104 may also include a deployable slowing device 230. The deployable slowing device 230 may include any suitable device capable of slowing down the descent of the UAV 104 when deployed. For example, the deployable slowing device 230 may include a streamer, a parachute, or other comparable structure coupled to a deploying means. The deploying means may be electrically actuated, mechanically actuated, and/or actuated in any other suitable manner. In some examples, the UAV 104 may include more than one deployable slowing device 230. For example, a plurality of such devices 230 may be deployed about the perimeter of the UAV 104 (e.g., at each of the propulsion devices 220).

Figure 3:
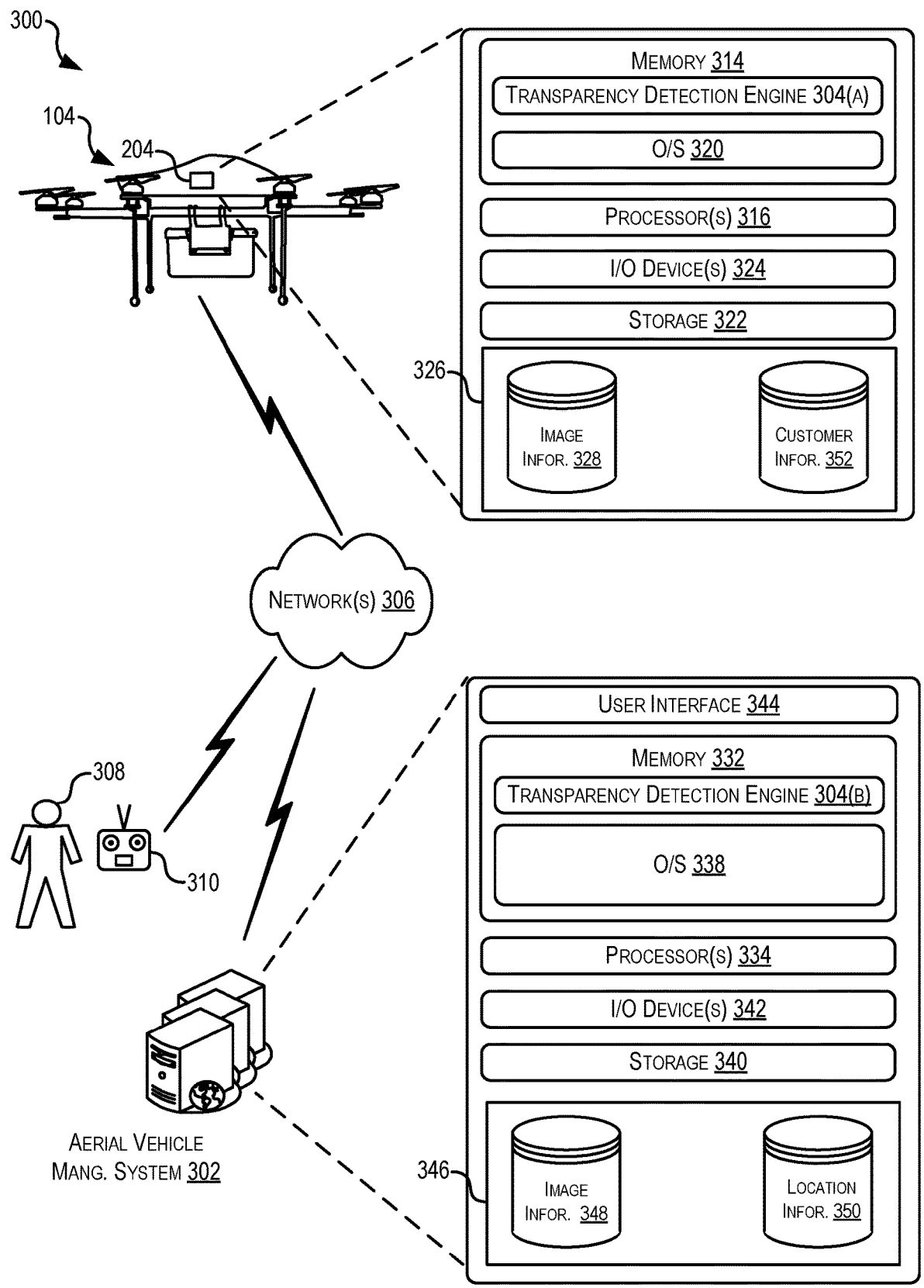
FIG. 3 is an example schematic architecture and devices for implementing techniques relating to detecting transparent elements in a UAV environment, according to at least one example.

FIG. 3 illustrates an example schematic architecture 300 for implementing techniques relating to detecting transparent elements in a UAV environment, according to at least one example. The architecture 300 may include an aerial vehicle management system 302

The aerial vehicle management system 302 may be included as part of an electronic marketplace (not shown) and interface with purchase and delivery services of the electronic marketplace. In this manner, the aerial vehicle management system 302 may coordinate delivery of items via UAVs, such as the UAV 104, to customers of the electronic marketplace. In some examples, the aerial vehicle management system 302 may coordinate flight plans of the UAV 104 and other UAVs 104 (e.g., compute routes, identify landing locations, etc.). In some examples, the aerial vehicle management system 302 may be a stand-alone service operated on its own.

In either example, the aerial vehicle management system 302 may be in communication with the UAV 104 and a controller 310 via one or more network(s) 306 (hereinafter, "the network 306"). An operator 308 may utilize the controller 310 to control aspects of the UAV 104. The network 306 may include any one or a combination of many different types of networks, such as cable networks, the Internet, wireless networks, cellular networks, radio networks, and other private and/or public networks. The aerial vehicle management system 302 may be configured to provide back-end control of the UAV 104 prior to, during, and after completion of its mission. In some examples, the UAV 104 may be configured to accomplish its mission (e.g., deliver its payload to a customer) with little to no communication with the aerial vehicle management system 302.

Turning now to the details of the UAV management device 204 of the UAV 104, the UAV management device 204 may include at least one memory 314 and one or more processing units (or processor(s)) 316. The processor(s) 316 may be implemented as appropriate in hardware, computer-executable instructions, software, firmware, or combinations thereof. Computer-executable instruction, software, or firmware implementations of the processor(s) 316 may include computer-executable or machine-executable instructions written in any suitable programming language to perform the various functions described. The memory 314 may include more than one memory and may be distributed throughout the UAV management device 204 and/or the aerial vehicle management system 302. The memory 314 may store program instructions (e.g., a transparency detection engine 304(a)) that are loadable and executable on the processor(s) 316, as well as data generated during the execution of these programs. Depending on the configuration and type of memory including the transparency detection engine 304(a), the memory 314 may be volatile (such as random access memory (RAM)) and/or non-volatile (such as read-only memory (ROM), flash memory, or other memory). The UAV management device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 314 may include multiple different types of memory, such as static random access memory (SRAM), dynamic random access memory (DRAM), or ROM. The memory 314 may include an operating system 320 and one or more application programs, modules, or services for implementing the features disclosed herein including at least the transparency detection engine 304.

In some examples, the UAV management device 204 may also include additional storage 322, which may include removable storage and/or non-removable storage. The additional storage 322 may include, but is not limited to, magnetic storage, optical disks, and/or tape storage. The disk drives and their associated computer-readable media may provide non-volatile storage of computer-readable instructions, data structures, program modules, and other data for the computing devices.

The memory 314 and the additional storage 322, both removable and non-removable, are examples of computer-readable storage media. For example, computer-readable storage media may include volatile or non-volatile, removable or non-removable media implemented in any suitable method or technology for storage of information such as computer-readable instructions, data structures, program modules, or other data. As used herein, modules may refer to programming modules executed by computing systems (e.g., processors) that are part of the transparency detection engine 304. The modules of the transparency detection engine 304(a) may include one or more components, modules, and the like. The UAV management device 204 may also include input/output (I/O) device(s) and/or ports 324, such as for enabling connection with a keyboard, a mouse, a pen, a voice input device, a touch input device, a display, speakers, a printer, or other I/O device. The I/O device(s) 324 may enable communication with the other systems of the UAV 104 (e.g., other parts of the management system, power system, communication system, navigation system, propulsion system, and the retaining system).

The UAV management device 204 may also include a data store 326. The data store 326 may include one or more databases, data structures, or the like for storing and/or retaining information associated with implementation of the techniques described herein. In some examples, the data store 326 may include databases, such as an image information database 328 and a customer information database 352.

The image information database 328 may be used to retain information about images used in accordance with techniques described herein. For example, the information may include information about images of objects that can be detected in reflections in images. Such objects can include depictions of the UAV 104 from various perspectives (e.g., sizes, orientations, etc.), depictions of portions of the UAV 104 (e.g., elements of the UAV 104) from various perspectives, depictions of patterns (e.g., a pattern of lights projected by the UAV 104) from various perspectives, and any other object which may be detected in reflections. In some examples, the UAV 104 updates the image information database 328 with information about images captured by the UAV 104. For example, after the UAV 104 classifies an image as including a transparent element, the image and location information associated with the image may be saved to the database 328. This information may be used as part of future route generation and/or map generation.

The customer information database 352 may be used to retain information pertaining to customers of an electronic marketplace associated with the aerial vehicle management system 302. Such information may include, for example, delivery address information, customer account information (e.g., electronic profiles for individual users), demographic information for customers, payment instrument information for customers (e.g., credit card, debit cards, bank account information, and other similar payment processing instruments), account preferences for customers, shipping preferences for customers, purchase history of customers, and other similar information pertaining to a particular customer and sets of customers, of the electronic marketplace. In some examples, the customer information database 352 may include any suitable customer information that may be used by the UAV 104 in implementing and/or affecting its flight plan.

Turning now to the aerial vehicle management system 302, the aerial vehicle management system 302 may include one or more service provider computers, perhaps arranged in a cluster of servers or as a server farm. In some examples, the aerial vehicle management system 302 may include one or more virtual computers. The aerial vehicle management system 302 may include at least one memory 332 and one or more processing units (or processor(s)) 334. The processor(s) 334 may be implemented as appropriate in hardware, computer-executable instructions, software, firmware, or combinations thereof. Computer-executable instructions, software or firmware implementations of the processor(s) 334 may include computer-executable or machine-executable instructions written in any suitable programming language to perform the various functions described. The memory 332 may include more than one memory and may be distributed throughout the aerial vehicle management system 302. The memory 332 may store program instructions (e.g., the transparency detection engine 304(*b*)) that are loadable and executable on the processor(s) 334, as well as data generated during the execution of these programs. The memory 332 may be volatile (such as random access memory (RAM)) and/or non-volatile (such as read-only memory (ROM), flash memory, or other memory).

The aerial vehicle management system 302 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 332 may include multiple different types of memory, such as static random access memory (SRAM), dynamic random access memory (DRAM), or ROM. The memory 332 may also include an operating system 338 and one or more application programs, modules or services for implementing the techniques described herein including at least the UAV management device 204(*b*). The transparency detection engine 304(*b*), in some examples, may function similar to the transparency detection engine 304(*a*). For example, when the UAV 104 is in network communication with the aerial vehicle management system 302, the UAV 104 may receive at least some instructions from the aerial vehicle management system 302 as the transparency detection engine 304(*b*) is executed by the processors 334. In some examples, the UAV 104 executes the transparency detection engine 304(*a*) independent of the aerial vehicle management system 302.

In some examples, the aerial vehicle management system 302 may also include additional storage 340, which may include removable storage and/or non-removable storage. The additional storage 340 may include, but is not limited to, magnetic storage, optical disks, and/or tape storage. The disk drives and their associated computer-readable media may provide non-volatile storage of computer-readable instructions, data structures, program modules, and other data for the computing devices.

The memory 332 and the additional storage 340, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the aerial vehicle management system 302. The aerial vehicle management system 302 may also include input/output (I/O) device(s) and/or ports 342, such as for enabling connection with a keyboard, a mouse, a pen, a voice input device, a touch input device, a display, speakers, a printer, or other I/O device.

In some examples, the aerial vehicle management system 302 may include a user interface 344. The user interface 344 may be utilized by an operator, or other authorized user to access portions of the aerial vehicle management system 302. In some examples, the user interface 344 may include a graphical user interface, web-based applications, programmatic interfaces such as application programming interfaces (APIs), or other user interface configurations.

For example, the user interface 344 may enable an operator to remotely control the UAV 104. The aerial vehicle management system 302 may also include data store 346. The data store 346 may include one or more databases, data structures, or the like for storing and/or retaining information associated with the aerial vehicle management system 302. The data store 346 may include databases, such as an image information database 348 and a customer information database 350. The image information database 348 and the customer information database 350 may include similar information as the image information database 328 and the customer information database 352. In some examples, the aerial vehicle management system 302 may store a larger amount of information in the data store 346 than the UAV management device 204 is capable of storing in the data store 326. Thus, in some examples, at least a portion of the information from the databases in the data store 346 is copied to the databases of the data store 326, e.g., periodically, occasionally, in connection with an event, or otherwise. In this manner, the data store 326 may have up-to-date information, without having to maintain the databases. In some examples, this information may be transferred as part of a flight plan prior to the UAV 104 beginning the flight plan, on an as-needed basis, and in any other suitable manner.

Figure 4:
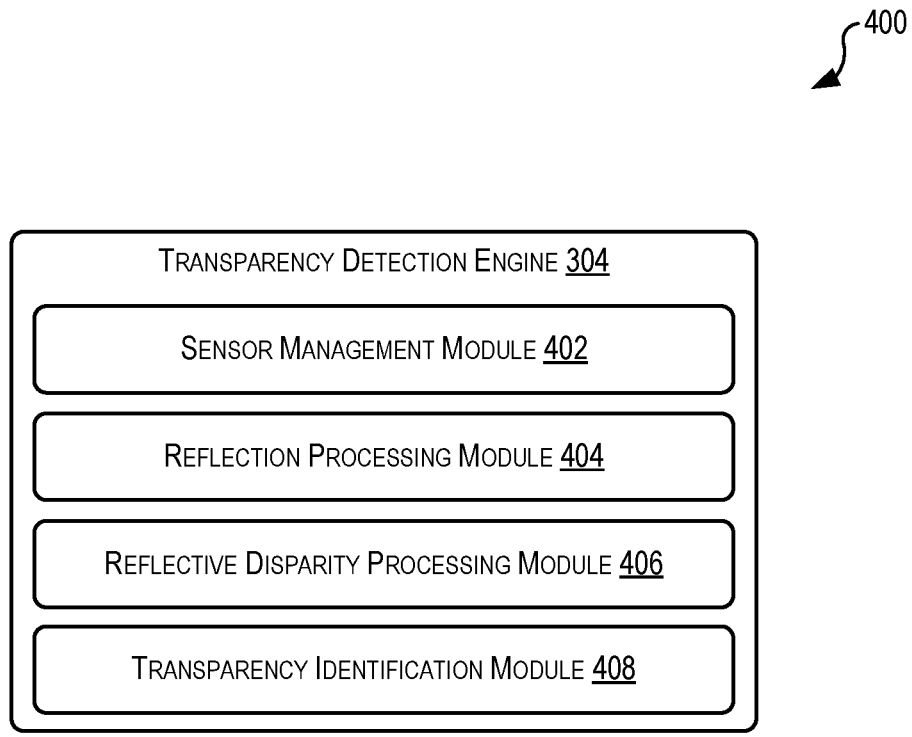
FIG. 4 is an example device for implementing techniques relating to detecting transparent elements in a UAV environment, according to at least one example.

FIG. 4 illustrates an example device 400 including the transparency detection engine 304. The transparency detection engine 304 may be configured to manage one or more sub-modules, components, engines, and/or services directed to examples disclosed herein. In some examples, the transparency detection engine 304 includes a sensor management module 402, a reflection processing module 404, a reflective disparity processing module 406, and a transparency identification module 408. While these modules are illustrated in FIG. 4 and will be described as performing discrete tasks with reference to the flow charts, it is understood that FIG. 4 illustrates example configurations and other configurations performing other tasks and/or similar tasks as those described herein may be implemented according to the techniques described herein. Other modules, components, engines, and/or services may perform the same tasks as the transparency detection engine 304 or other tasks. Each module, component, or engine may be implemented in software, firmware, hardware, and in any other suitable manner.

The sensor management module 402 may be configured to manage the operation of one or more sensors of the UAV 104. For example, this can include instructing the sensors and/or devices including sensors (e.g., image capture devices) to gather sensor information such as image information. This can also include instructing devices such as an image projection device to project light information.

The reflection processing module 404 may be configured to process sensor information such as images to detect reflections of objects present in the images, and to identify the objects as belonging to some class of known objects. For example, the reflection processing module 404 may detect a reflected image (e.g., a reflection) and identify, in the reflected image, a portion of the UAV 104. In some examples, this may include using any suitable object or feature recognition technique. For example, such techniques may include edge detection, recognition by parts, appearance-based method (e.g., edge matching, divide-and-conquer, grayscale matching, gradient matching, histograms of receptive field responses, large modelbases, and the like), feature-based method (e.g., interpretation trees, hypothesize and test, pose consistency, pose clustering, invariance, geometric hashing, scale-invariant feature transform (SIFT), and the like.

The reflective disparity processing module 406 may be configured to process sensor information such as images to detect reflective disparities present in the images. For example, the reflective disparity processing module 406 may detect objects present in the images and/or characteristics of the images, and use this information to determine differences between at least two images. In some examples, this may include using any suitable object or feature recognition technique. For example, such techniques may include edge detection, recognition by parts, appearance-based method (e.g., edge matching, divide-and-conquer, grayscale matching, gradient matching, histograms of receptive field responses, large modelbases, and the like), feature-based method (e.g., interpretation trees, hypothesize and test, pose consistency, pose clustering, invariance, geometric hashing, scale-invariant feature transform (SIFT), and the like. In some examples, the reflective disparity processing module 406 may compute absolute differences between the two images, with or without regard to objects present in the images. For example, the reflective disparity processing module 406 may compare pixel-to-pixel (or groups of pixels to groups of pixels) in a set of two images to determine absolute differences in each pixel. This information may be used to determine more global differences between the images. For example, if first pixels in a first image are all brighter by a same value than corresponding second pixels in a second image, and one of the images was captured using a polarization filter, it may be inferred that there is an absolute brightness difference between the two images.

The transparency identification module 408 may be configured to take as input information from one of the reflection processing module 404 and/or the reflective disparity processing module 406. This information may be used by the transparency identification module 408 to identify transparent elements present in a scene depicted in images captured under the direction of the sensor management module 402. Identifying transparent elements may include classifying transparency of images at an image level, object level, and/or pixel level.

Figure 5:
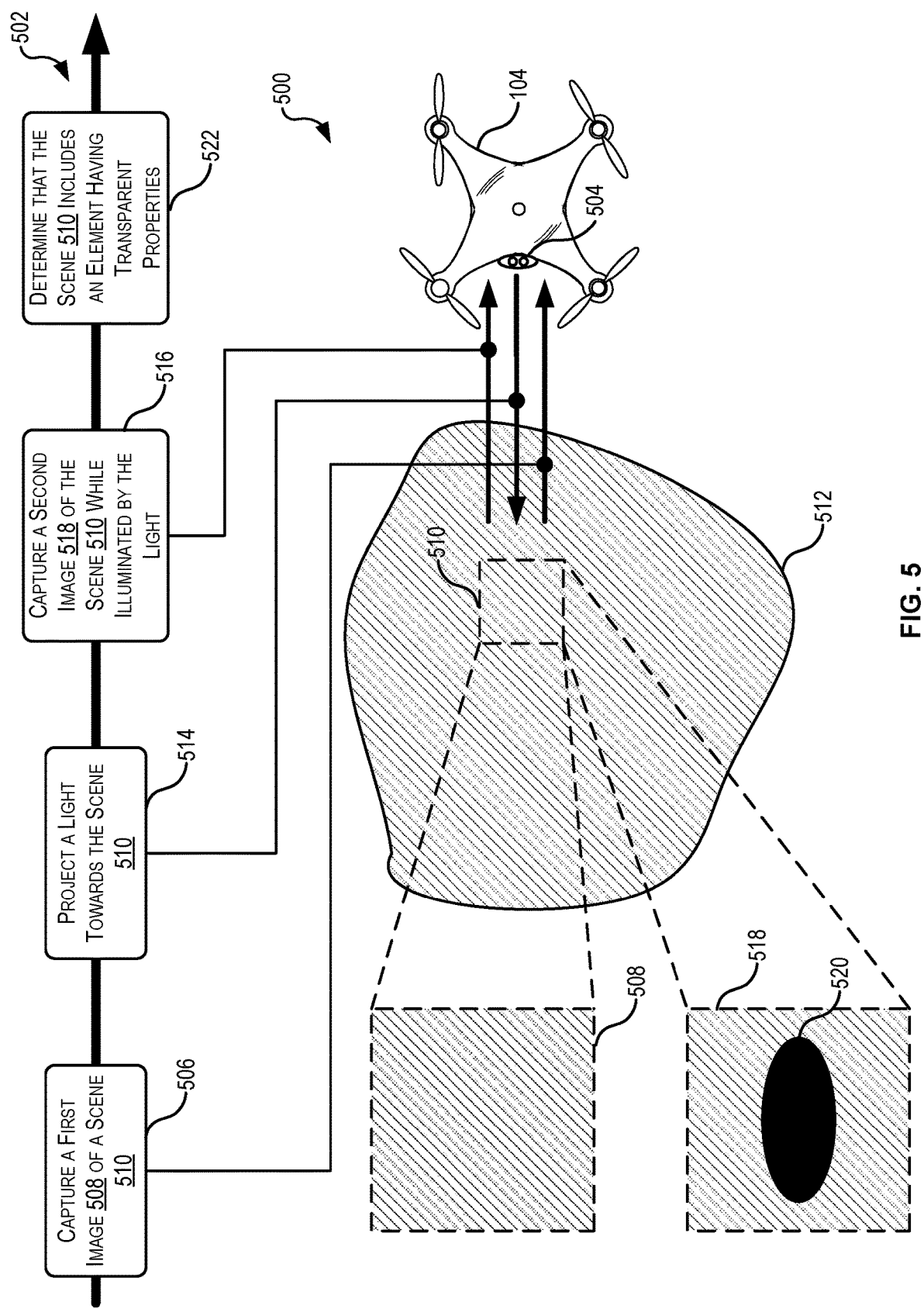
FIG. 5 is an example diagram depicting an example flow for detecting transparent elements in a UAV environment, according to at least one example.

FIG. 5 illustrates a simplified diagram 500 and an example process 502 for detecting transparent elements in a UAV environment, according to at least one example. In particular, the process 502 corresponds an example for determining that a scene includes an element having transparent properties using active illumination. The diagram 500 depicts the UAV 104 operating in a UAV environment. Aspects of the diagram 500 correspond to the blocks in the process flow 502.

The UAV 104 includes a device package 504. The device package 504 may include any suitable combination of sensors, systems, and/or devices to implement the techniques described herein with reference to FIG. 5. For example, the device package 504 may include an image capture device and an image projection device.

The process 502 begins at 506 by capturing a first image 508 of a scene 510. The scene 510 may correspond to a body of water 512, which may be part of an even larger scene not depicted in the first image 508 and/or FIG. 5. In some examples, the body of water 512 is just an example of a type of element having transparent properties that can be identified using the techniques described herein. For example, instead of the body of water 512, the scene can include a mirror, glass, metal, other liquids, and any other material capable of specularly reflecting light. In any event, the first image 508 of the scene 510 may have been captured by directing the image capture device of the device package 504 toward the body of water 512 and instructing capture. The process 502 may be used to automatically determine that the scene 510 includes an element having transparent properties (e.g., water which belongs to the body of water 512). The process 502 may also be used to automatically determine that other scenes include elements having transparent properties and/or are capable of specularly reflecting light (e.g., other liquids that reflect light, glass, snow, mirrors, metals, painted objects, and other similar elements).

In some examples, the UAV 104 may fly near a surface of the body of water 512 as part of capturing the images described herein. Downwash from the propulsion system of the UAV 104 may disrupt the surface of the body of water 512. This may impact identifying the body of water 512 as being a transparent element. In some examples, the UAV 104 may adjust its pitch, yaw, and/or roll as part of capturing the images described herein. This too may impact identifying the body of water 512 as being a transparent element. In some examples, the UAV 104 flies a predetermined route while capturing the images, which may include approaching the body of water 512, adjusting its pitch, yaw, and/or roll, flying back and forth over the body of water 512, circling around the body of water 512, and performing any other suitable technique to capture images from different perspectives.

At 514, the process 502 projects a light towards the scene 510. The light projected at 514 may emanate from the image projection device of the device package 504. In some examples, the light is projected from a flash device coupled to the image capture device. In any event, the light may illuminate the scene 510. At 516, the process 502 captures a second image 518 of the scene 510 while the light illuminates the scene 510. In some examples, because of the light, the second image 518 may include an active illumination object 520. The active illumination object 520 may correspond to the light projection device that projected the light toward the scene 510. In some examples, the active illumination object 520 is an example of a reflection. For example, the active illumination object 520 may be present in the second image 518 at least because the scene 510 includes an element that is capable of reflecting the light from the light projection device. Thus, the active illumination object 520 may be considered "active" because it is created by the light projection device actively shining light towards the scene 510.

At 522, the process 502 determines that the scene 510 includes an element having transparent properties. In this example, it may be determined that the entirety of the scene 510 includes the element having transparent properties, or at least the portion of the scene 510 that overlaps with the active illumination object 520. In some examples, it may be inferred that the entirety of the scene 510 includes the transparent element, even if only a portion of the scene 510 actually reflects light.

Figure 6:
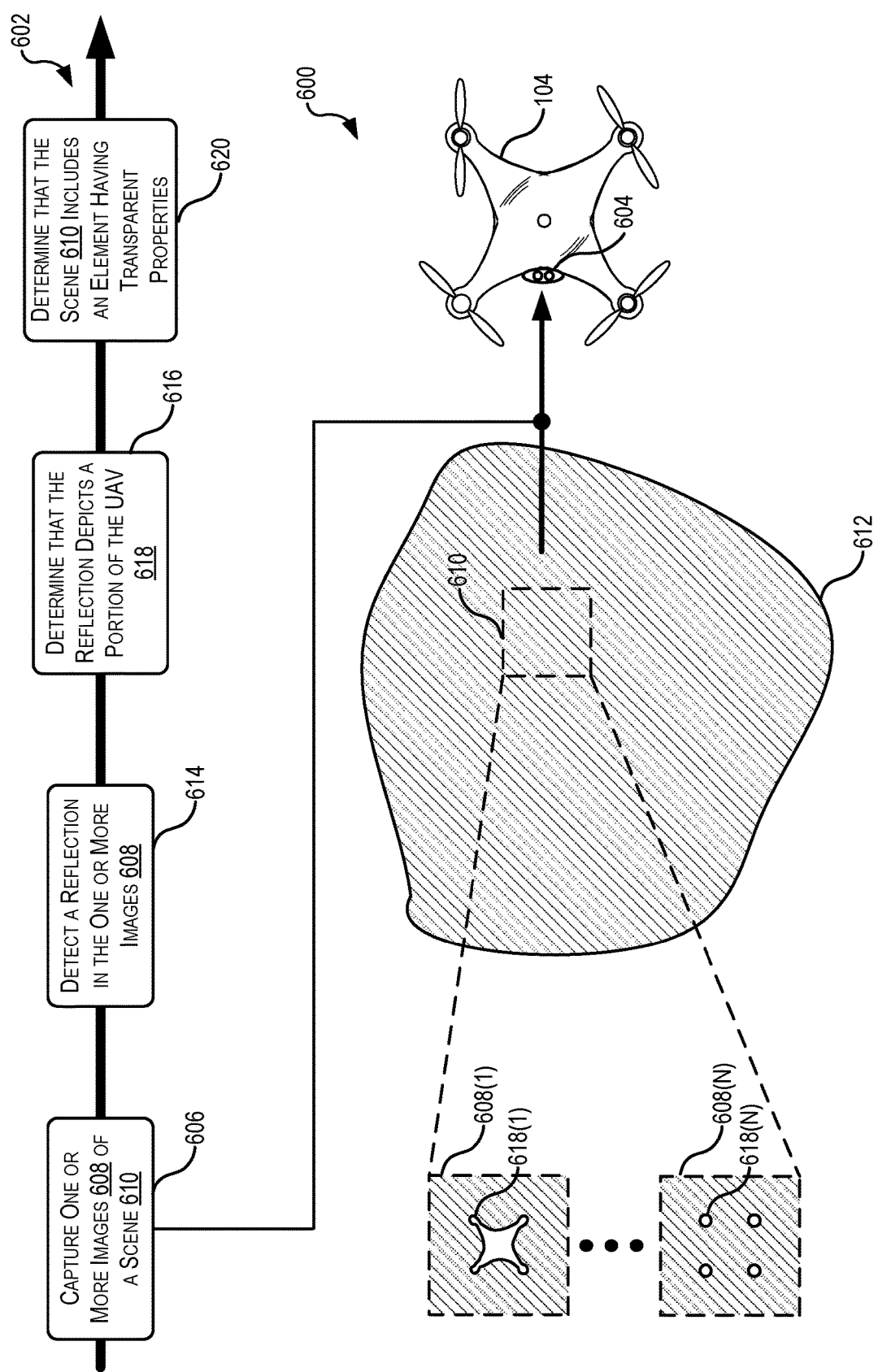
FIG. 6 is an example diagram depicting an example flow for detecting transparent elements in a UAV environment, according to at least one example.

FIG. 6 illustrates a simplified diagram 600 and an example process 602 for detecting transparent elements in a UAV environment, according to at least one example. In particular, the process 602 corresponds to an example for determining that a scene includes an element having transparent properties by detecting a portion of the UAV in a reflection. The diagram 600 depicts the UAV 104 operating in a UAV environment. Aspects of the diagram 600 correspond to the blocks in the process flow 602.

The UAV 104 includes a device package 604. The device package 604 may include any suitable combination of sensors, systems, and/or devices to implement the techniques described herein with reference to FIG. 6. For example, the device package 604 may include an image capture device. The device package 604 is an example of the device package 504.

The process 602 begins at 606 by capturing one or more images 608(1)-608(N) of a scene 610. The scene 610 may correspond to a body of water 612, which may be part of an even larger scene not depicted in any of the one or more images 608 and/or FIG. 6. Thus, the one or more images 608 of the scene 610 may have been captured by directing the image capture device of the device package 604 toward the body of water 612 and instructing capture. The process 602 may be used to automatically determine that the scene 610 includes an element having transparent properties (e.g., water which belongs to the body of water 612). The process 602 may also be used to automatically determine that other scenes include elements having transparent properties and/or are capable of specularly reflecting light (e.g., other liquids that reflect light, glass, snow, mirrors, metals, painted objects, and other similar elements).

In some examples, the UAV 104 may fly near a surface of the body of water 612 as part of capturing the images described herein. Downwash from the propulsion system of the UAV 104 may disrupt the surface of the body of water 612. This may impact identifying the body of water 612 as being a transparent element. In some examples, the UAV 104 may adjust its pitch, yaw, and/or roll as part of capturing the images described herein. This too may impact identifying the body of water 612 as being a transparent element. In some examples, the UAV 104 flies a predetermined route while capturing the images, which may include approaching the body of water 612, adjusting its pitch, yaw, and/or roll, flying back and forth over the body of water 612, circling around the body of water 612, and performing any other suitable technique to capture images from different perspectives.

At 614, the process 602 detects a reflection in the one or more images 608. The reflection may be present in the images 608 by virtue of the UAV 104 being adjacent the body of water 612, which has reflective properties, when the images 608 were captured. If the reflection can be associated with a predetermined object such as a part of the UAV 104, it may be determined that the reflection belongs to the UAV 104 and that the scene 610 includes an element having transparent properties. The reflection may be detected by processing the images 608 using an object detection technique.

At 616, the process 602 determines that the reflection depicts a portion of the UAV 618(1)-618(N). For the image 608(1), it may be determined that the reflection in the image 608(1) corresponds to a bottom side of the UAV 104 (e.g., the portion of the UAV 618(1)). For the image 608(N), it may be determined that the reflection in the image 608(N) corresponds to a pattern of lights projected from the UAV 104 (e.g., the portion of the UAV 618(N)). As part of determining that the reflection depicts the portion of the UAV 618, the process 602 may identify the objects depicted in the reflection (e.g., an outline of the UAV 104, a pattern of lights, and any other suitable portion of the UAV 104), and determine that the identified objects belong to the UAV 104. This may include comparing the portion depicted in the images 608 to other images of the UAV 104.

At 620, the process 602 determines that the scene 610 includes an element having transparent properties. In this example, it may be determined that the entirety of the scene 610 includes the element having transparent properties, or at least the portion of the scene 610 that includes the reflection of the portion of the UAV 618 includes the element having transparent properties. In some examples, it may be inferred that the entirety of the scene 610 includes the transparent element, even if only a portion of the scene 610 actually reflects light. In some examples, the determination at 620 may be possible at least because the reflection was detected and the portion of the UAV 618 was identified in the reflection.

Figure 7:
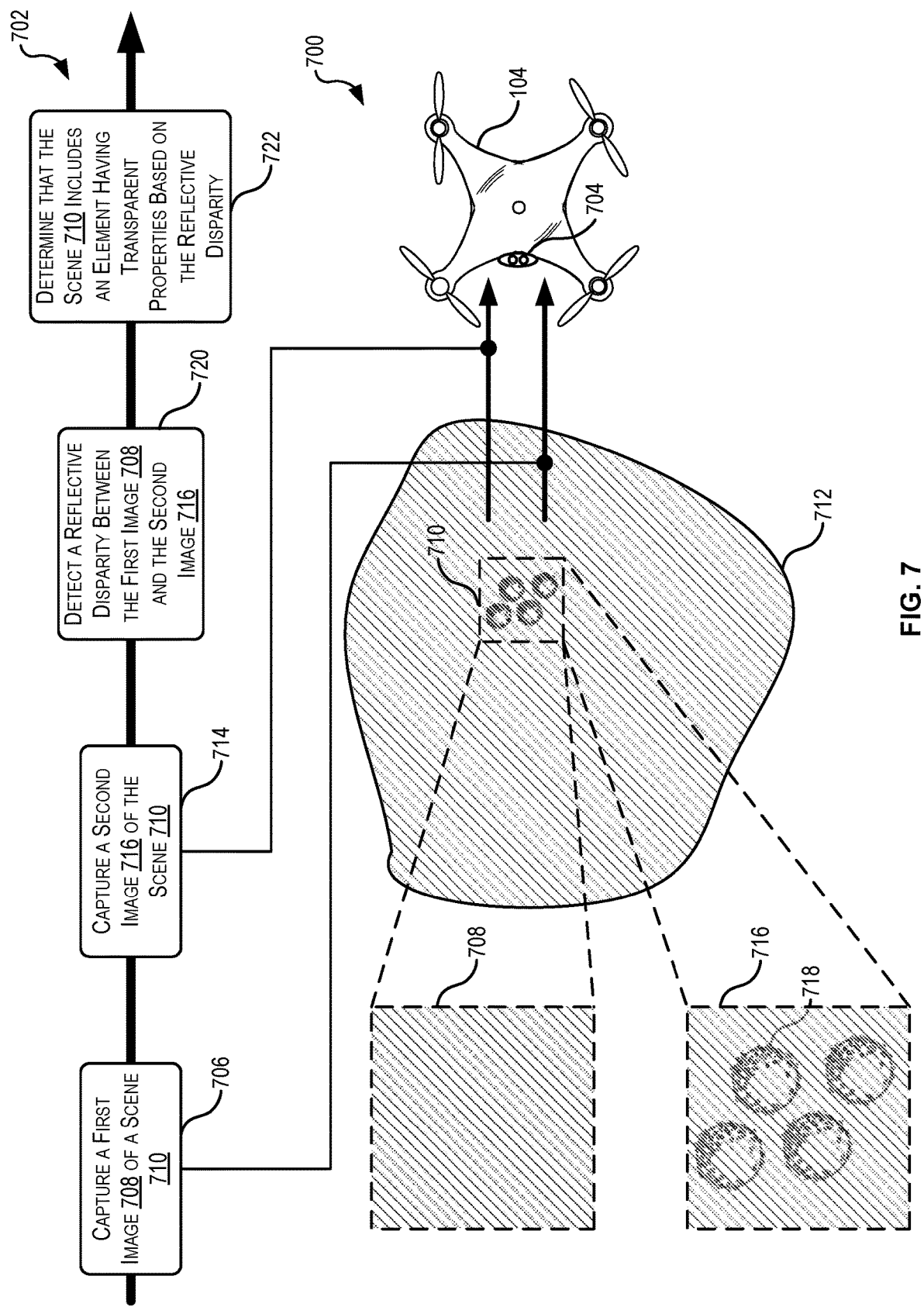
FIG. 7 is an example diagram depicting an example flow for detecting transparent elements in a UAV environment, according to at least one example.

FIG. 7 illustrates a simplified diagram 700 and an example process 702 for detecting transparent elements in a UAV environment, according to at least one example. In particular, the process 702 corresponds to an example for determining that a scene includes an element having transparent properties by detecting reflective disparities among two or more images captured with different polarization filters or at least one polarization filter. The diagram 700 depicts the UAV 104 operating in a UAV environment. Aspects of the diagram 700 correspond to the blocks in the process flow 702.

The UAV 104 includes a device package 704. The device package 704 may include any suitable combination of sensors, systems, and/or devices to implement the techniques described herein with reference to FIG. 7. For example, the device package 704 may include an image capture device. The device package 704 is an example of the device packages 504 and 604.

The process 702 begins at 706 by capturing a first image 708 of a scene 710. The scene 710 may correspond to a body of water 712, which may be part of an even larger scene not depicted in the first image 708 and/or the FIG. 7. Thus, the image first 708 (and other images) of the scene 710 may have been captured by directing the image capture device of the device package 704 toward the body of water 712 and instructing capture. In this manner, the first image 708 may depict the scene 710. The first image 708 may be captured using a first polarization filter. The first polarization filter may filter certain light reflected from the body of water 712. For example, the first polarization filter may filter polarized light that has a perpendicular direction, an elliptical direction, a circular direction, and light that has any other direction of polarization. In some examples, the first image 708 is captured without a polarization filter.

The process 702 may be used to automatically determine that the scene 710 includes an element having transparent properties (e.g., water which belongs to the body of water 712). The process 702 may also be used to automatically determine that other scenes include elements having transparent properties and/or capable of specularly reflecting light (e.g., other liquids that reflect light, glass, snow, mirrors, metals, painted objects, and other similar elements).

In some examples, the UAV 104 may fly near the surface of the body of water 712 as part of capturing the images described herein. Downwash from the propulsion system of the UAV 104 may disrupt the surface of the body of water 712. This may impact identifying the body of water 712 as being a transparent element. In some examples, the UAV 104 may adjust its pitch, yaw, and/or roll as part of capturing the images described herein. This too may impact identifying the body of water 712 as being a transparent element. In some examples, the UAV 104 flies a predetermined route while capturing the images, which may include approaching the body of water 712, adjusting its pitch, yaw, and/or roll, flying back and forth over the body of water 712, circling around the body of water 712, and performing any other suitable technique to capture images from different perspectives.

At 714, the process 702 captures a second image 716 of the scene 710. Like the first image 708, the second image 716 may depict the scene 710. The second image 716 may be captured at or around the same time as the first image 708 and from a similar perspective (e.g., by using the same image capture device or a different image capture device having a similar mounting position and orientation with respect to the scene 710). In this manner, the two images 708, 716 may correspond to roughly the same area of the scene 710. The second image 716 may be captured using a second polarization filter. Like the first polarization filter, the second polarization filter may filter certain light reflected from the body of water 712. For example, the second polarization filter may filter polarized light that has a perpendicular direction, an elliptical direction, a circular direction, and light that has any other direction of polarization. In some examples, the second image 716 is captured without a polarization filter. Because of the second polarization filter, the second image 716 may depict different content when compared to the first image 708. For example, the second image 716 depicts vegetation 718. The vegetation 718 may have been present in the scene 710 all along, but is more visible in the second image 716 because the second image 716 was captured using the second polarization filter. For example, the second polarization filter may function to remove polarized light from the scene 710 that would otherwise produce glare and make it difficult to capture the vegetation 718. The vegetation 718 may give the second image 716 additional texture when compared to the first image 708.

At 720, the process 702 detects a reflective disparity between the first image 708 and the second image 716. This can include comparing the two images 708, 716 and identifying texture differences, brightness differences, feature differences, and any other difference based on reflected light. The texture in the second image 716 caused by the vegetation 718 may be considered a texture difference when compared to the first image 708.

At 722, the process 702 determines that the scene 710 includes an element having transparent properties based on the reflective disparity. In particular, the fact that the vegetation 718 is present in the second image 716, while missing from the first image 708 (e.g., a reflective disparity), may be evidence that the scene 710 includes the element having transparent properties. In some examples, it may be determined that the entirety of the scene 710 includes the element having transparent properties. In some examples, it may be inferred that the entirety of the scene 710 includes the transparent element, even if only a portion of the scene 710 contributes to the reflective disparity.

FIGS. 8, 9, 10, and 11 illustrate example flow diagrams showing respective processes 800, 900, 1000, and 1100, as described herein. These processes 800, 900, 1000, and 1100 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 8:
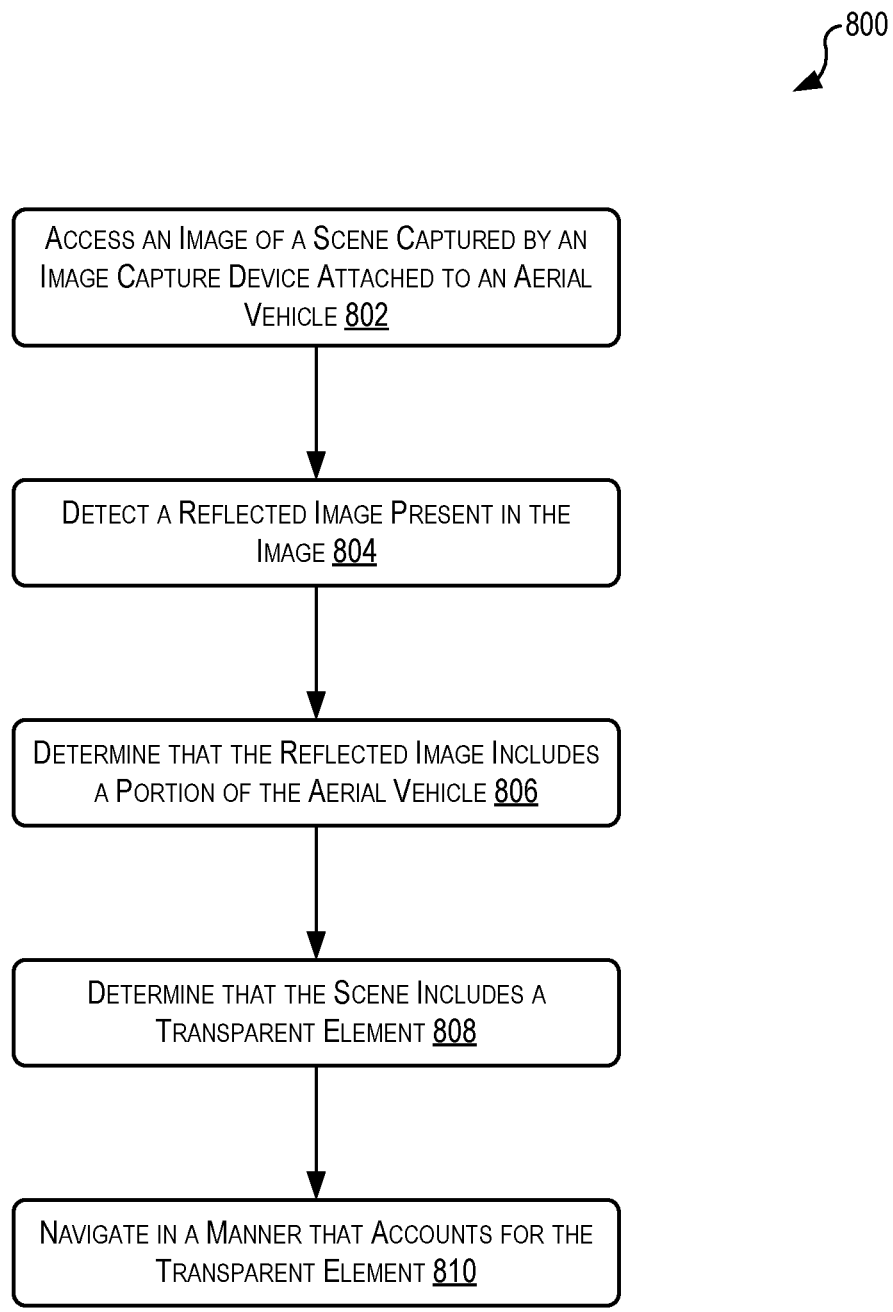
FIG. 8 is a flow diagram depicting example acts for implementing techniques relating to detecting transparent elements in a UAV environment, according to at least one example.

FIG. 8 depicts the process 800 including example acts or techniques relating to detecting transparent elements in a UAV environment, according to at least one example. The transparency detection engine 304 (FIG. 3) may perform the process 800 of FIG. 8. The process 800 begins at 802 by accessing an image of a scene captured by an image capture device attached to an aerial vehicle. This may be performed by the sensor management module 402 (FIG. 4). In some examples, the image capture device captures the image while the aerial vehicle is flying.

At 804, the process 800 detects a reflected image present in the image. This may be performed by the reflection processing module 404 (FIG. 4). In some examples, detecting the reflected image present in the image may include using an object recognition technique. The reflected image can include a specular reflection.

At 806, the process 800 determines that the reflected image includes a portion of the aerial vehicle. This may be performed by the reflection processing module 404. In some examples, the portion of the aerial vehicle includes a side portion of the aerial vehicle, an underside portion of the aerial vehicle, the aerial vehicle, a light source attached to the aerial vehicle (e.g., an infrared light source, a visible light source, a laser light source, or any other type of light source), a plurality of light sources arranged in a pattern, or any other suitable part of the aerial vehicle. In some examples, determining that the reflected image includes at least the portion of the aerial vehicle includes identifying the pattern in the image. In some examples, determining that the reflected image includes at least the portion of the aerial vehicle includes comparing the detected reflected image to a plurality of images of the aerial vehicle. The plurality of images may depict the aerial vehicle from a plurality of different perspectives.

At 808, the process 800 determines that the scene includes a transparent element. This may be performed by the transparency identification module 408 (FIG. 4). Determining that the scene includes the transparent element may be based at least in part on determining that the reflected image includes the portion of the aerial vehicle. In some examples, the image depicts the reflected image on the transparent element in the scene.

At 810, the process 800 navigates in a manner that accounts for the transparent element. This may be performed by the UAV management device 204.

In some examples, navigating in a manner that accounts for the transparent element. In some examples, instructing movement of the aerial vehicle in a manner that accounts for the transparent element includes instructing a propulsion system of the aerial vehicle to propel the aerial vehicle.

Figure 9:
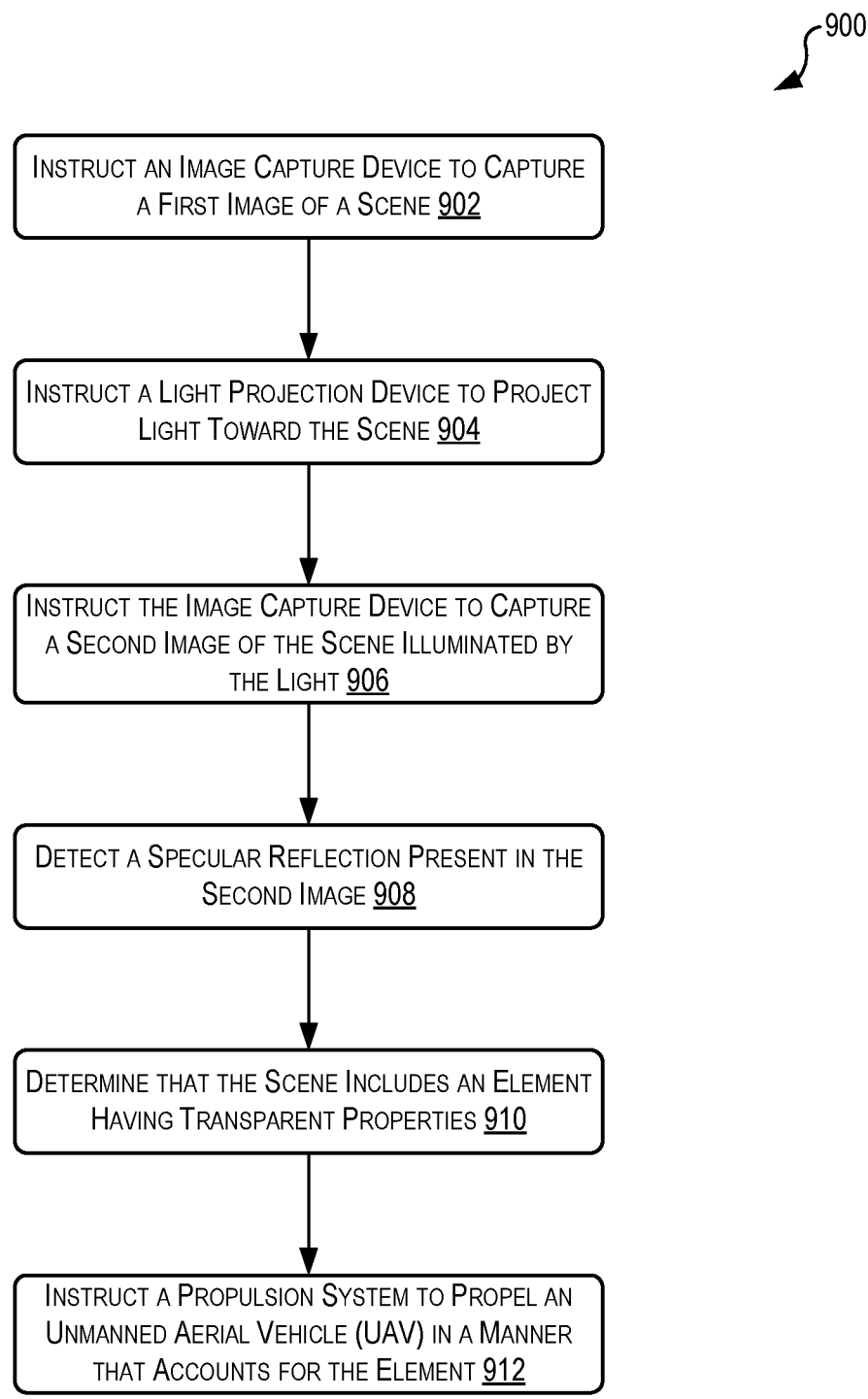
FIG. 9 is a flow diagram depicting example acts for implementing techniques relating to detecting transparent elements in a UAV environment, according to at least one example.

FIG. 9 depicts the process 900 including example acts or techniques relating to detecting transparent elements in a UAV environment, according to at least one example. The transparency detection engine 304 (FIG. 3) may perform the process 900 of FIG. 9. The process 900 begins at 902 by instructing an image capture device to capture a first image of a scene. This may be performed by the sensor management module 402 (FIG. 4). In some examples, the image capture device is attached to an unmanned aerial vehicle (UAV), and captures the image while the UAV is flying. The first image may be captured at a first time.

At 904, the process 900 instructs a light projection device to project light toward the scene. This may be performed by the sensor management module 402. The light projection device may be attached to the UAV, and may project light while the UAV is flying.

At 906, the process 900 instructs the image capture device to capture a second image of the scene illuminated by the light. This may be performed by the sensor management module 402. The second image may be captured at a second time, which may be after the first time. In some examples, the difference between the first time and the second time has a magnitude of milliseconds up to more than one second. In some examples, the second image alone is used (e.g., the first image is not taken or used) to implement the process 900.

At 908, the process 900 detects a specular reflection present in the second image. This may be performed by the reflection processing module 404 (FIG. 4). The specular reflection may be detected by comparing the first image and the second image. The specular reflection may correspond to the projected light. For example, the projected light may include a pulse of light and the specular reflection may include a reflection of the pulse of light.

At 910, the process 900 determines that the scene includes an element having transparent properties. This may be performed by the transparency identification module 408 (FIG. 4). In some examples, determining that the scene includes the element having transparent properties may be based at least in part on the specular reflection. For example, the presence of the specular reflection may be evidence that the scene includes an element (e.g., substance, object, etc.) capable of reflecting light, which may be a transparent element.

At 912, the process 900 instructs a propulsion system of the UAV in a manner that accounts for the element. This may be performed by the UAV management device 204. This can include using information about the element to assist in navigation of the UAV.

Figure 10:
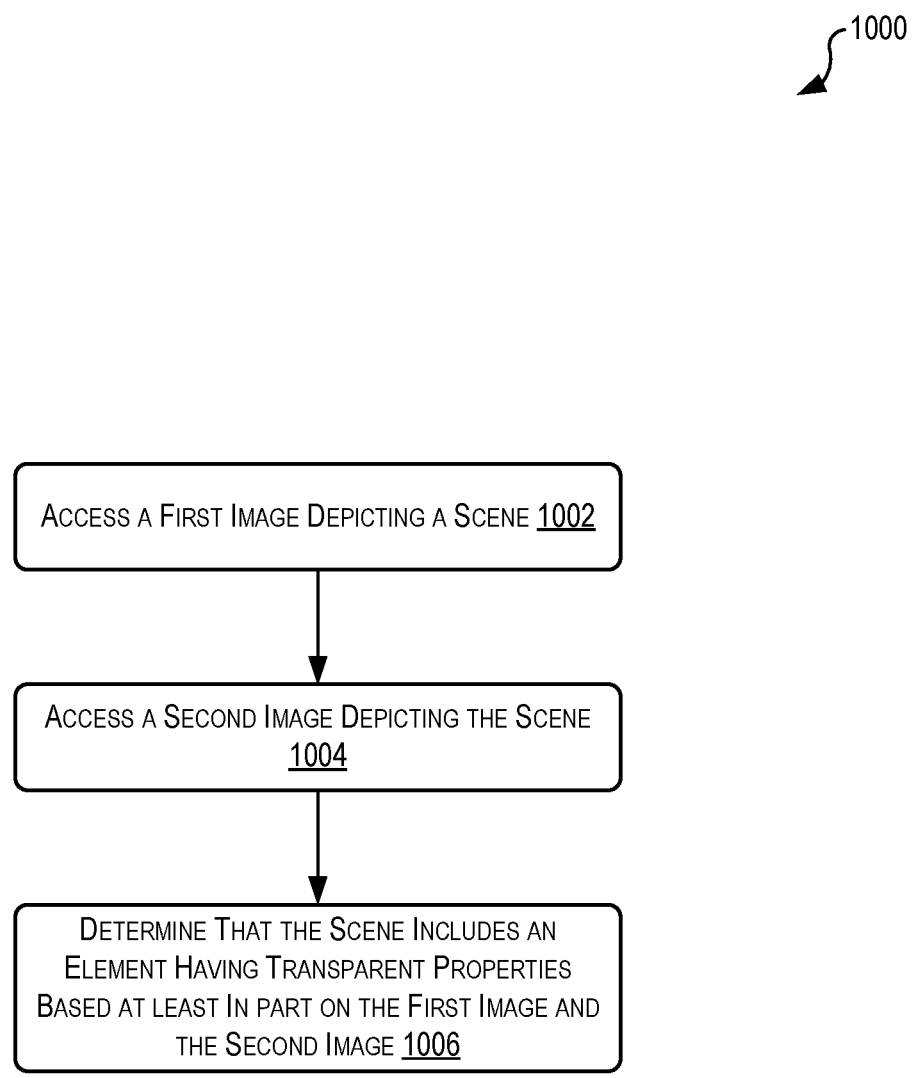
FIG. 10 is a flow diagram depicting example acts for implementing techniques relating to detecting transparent elements in a UAV environment, according to at least one example.

FIG. 10 depicts the process 1000 including example acts or techniques relating to detecting transparent elements in a UAV environment, according to at least one example. The transparency detection engine 304 (FIG. 3) may perform the process 1000 of FIG. 10. The process 1000 begins at 1002 by accessing a first image depicting the scene. This may be performed by the sensor management module 402 (FIG. 4). In some examples, accessing the first image may include retrieving the first image from a database or other storage structure. The first image may include a first polarization characteristic. The first polarization characteristic may indicate a degree of polarization of the first image.

At 1004, the process 1000 access a second image depicting the scene. This may be performed by the sensor management module 402. In some examples, the second image is captured by the image capture device and/or is accessed from a database or other storage structure. The second image may include a second polarization characteristic. The second polarization characteristic may indicate a second degree of polarization of the second image.

In some examples, the first image may be captured by an image capture device using a first polarization filter. The image capture device may be attached to an aerial vehicle. The second image may be captured by the image capture device using a second polarization filter. The first image and the second image may be captured while the aerial vehicle is flying.

In some examples, the first image may be captured by a first image capture device using a polarization filter. The first image capture device may be attached to an aerial vehicle. The second image may be captured by a second image capture device attached to the aerial vehicle. The first image and the second image may be captured by the respective image capture devices while the aerial vehicle is flying. In some examples, the first image and the second image are captured at or about the same time. In some examples, the second image capture device comprises a second polarization filter used in capturing the second image.

At 1006, the process 1000 determines that the scene includes an element having transparent properties based at least in part on the first image and the second image. This may be performed by the transparency identification module 408 (FIG. 4). In some examples, the element may be at least one of a mirror, glass, or a body of water.

In some examples, determining that the scene includes the element having transparent properties includes comparing the first image and the second image. Comparing the first image and the second image may include identifying a scene feature depicted by the first image, searching for the scene feature in the second image, and determining that the scene includes the element based at least in part on the scene feature being absent from the second image. The scene feature may be any suitable feature identifiable in one or more of the images. In some examples, the scene feature may be absent (e.g., invisible or partially visible) from the second image at least because the second image was not captured with a polarization filter to enable the scene feature to be visible. In some examples, the second image is captured with a polarization filter, just not one that enabled the scene feature to be visible. In some examples, comparing the first image and the second image includes classifying pixels of the first image and the second image as exhibiting the transparent properties.

In some examples, the process 1000 further includes instructing movement of an aerial vehicle in a manner that accounts for the element including the transparent properties. In some examples, instructing movement of the aerial vehicle in a manner that accounts for the element includes instructing a propulsion system of the aerial vehicle to propel the aerial vehicle.

The techniques described herein may be applied to other vehicles that rely on some form of autonomous navigation (e.g., automobiles, trains, planes, boats, motorcycles, farm equipment, etc.). For example, an unmanned automobile may benefit from the techniques described herein relating to detecting transparent elements. Systems of the unmanned automobile may be adjusted to account for the presence of detected transparent elements. For example, a braking system on the unmanned automobile may be instructed to slow down the velocity of the unmanned automobile as it approaches a transparent element. This may be in addition to reducing the power being applied to the propulsion system of the automobile.

Figure 11:
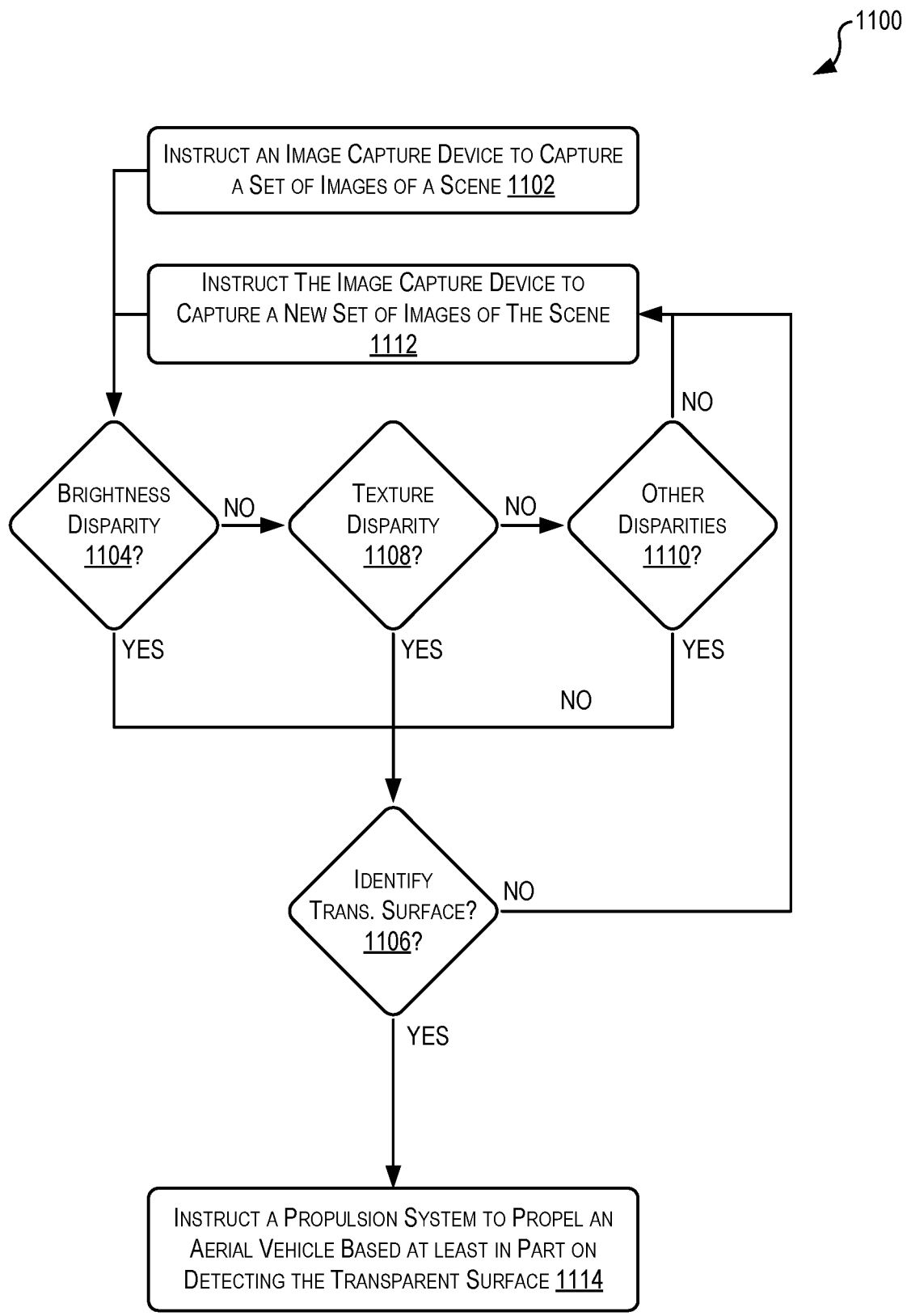
FIG. 11 is a flow diagram depicting example acts for implementing techniques relating to detecting transparent elements in a UAV environment, according to at least one example.

FIG. 11 depicts the process 1100 including example acts or techniques relating to detecting transparent elements in a UAV environment, in accordance with at least one example. The transparency detection engine 304 (FIG. 3) may perform the process 1100 of FIG. 11. The process 1100 begins at 1102 by instructing an image capture device to capture a set of images of scene. This may be performed by the sensor management module 402 (FIG. 4). In some examples, the image capture device is attached to an unmanned aerial vehicle (UAV) and captures the image while the UAV is flying.

At 1104, the process determines whether the set of images includes a brightness disparity. This may be performed by the reflective disparity processing module 406 (FIG. 4). In some examples, the brightness disparity may be present when the overall brightness of a first image is different than (e.g., brighter than or dimmer than) the overall brightness of a second image. In some examples, the brightness disparity may be localized to regions of the images (e.g., certain colors in the images appear brighter/dimmer, while others appear similar across the images).

If the brightness disparity is identified at 1104 (e.g., the answer at 1104 is YES), the process 1100 proceeds to 1106. At 1106, the process 1100 determines whether a transparent surface has been identified. This may be performed by the transparency identification module 408 (FIG. 4). In some examples, the transparent element is determined based at least in part on the brightness disparity being present in the set of images. In some examples, the transparent surface is identified if the brightness disparity reaches or exceeds some predetermined threshold.

If the brightness disparity is not identified at 1104 (e.g., the answer at 1104 is NO), the process 1100 proceeds to 1108. At 1108, the process 1100 determines whether the set of images includes a texture disparity. This may be performed by the reflective disparity processing module 406. In some examples, the texture disparity may be present when the overall texture of a first image is different than (e.g., having more texture or having less texture) the overall texture of a second image. In some examples, the texture disparity may be localized to regions of the images (e.g., certain regions in the images appear to have more texture when compared to other regions).

If the texture disparity is identified at 1108 (e.g., the answer at 1108 is YES), the process 1100 proceeds to 1106. At 1106, the process 1100 determines whether a transparent surface has been identified. In some examples, the transparent element is determined based at least in part on the texture disparity being present in the set of images. In some examples, the transparent surface is identified if the texture disparity reaches or exceeds some predetermined threshold.

If the texture disparity is not identified at 1108 (e.g., the answer at 1108 is NO), the process 1100 proceeds to 1110. At 1110, the process 1100 determines whether the set of images includes other disparities. This may be performed by the reflective disparity processing module 406. The other disparities may include other differences present in the set of images as a result of the images being captured with different polarization filters. For example, there may be feature disparities between the images (e.g., one or more features visible in a first image and not visible in a second image).

If other disparities are not identified at 1110 (e.g., the answer at 1110 is NO), the process 1100 proceeds to 1112. At 1112, the process 1100 instructs the image capture device to capture a new set of images of the scene. From 1112, the process 1100 returns to 1104 and so forth.

If at least one other disparity is identified at 1110 (e.g., the answer at 1110 is YES), the process 1100 proceeds to 1106. At 1106, the process 1100 determines whether a transparent surface has been identified. In some examples, the transparent element is determined based at least in part on the other disparities being present in the set of images. In some examples, the transparent surface is identified if the other disparities reach or exceed some predetermined thresholds.

If the transparent surface is not identified at 1106 (e.g., the answer at 1106 is NO), the process 1100 returns to 1112. If the transparent surface is identified at 1106 (e.g., the answer at 1106 is YES), the process 1100 proceeds to 1114. At 1114, the process 1100 instructs a propulsion system to propel the UAV based at least in part on detecting the transparent surface. This may be performed by the UAV management device 204. This can include using information about the surface to assist in navigation of the UAV by avoiding the transparent surface, landing on the transparent surface, etc. In some examples, the texture disparity, brightness disparity, feature disparity, and/or other disparities may be used together to identify the transparent surface at 1106.

Figure 12:
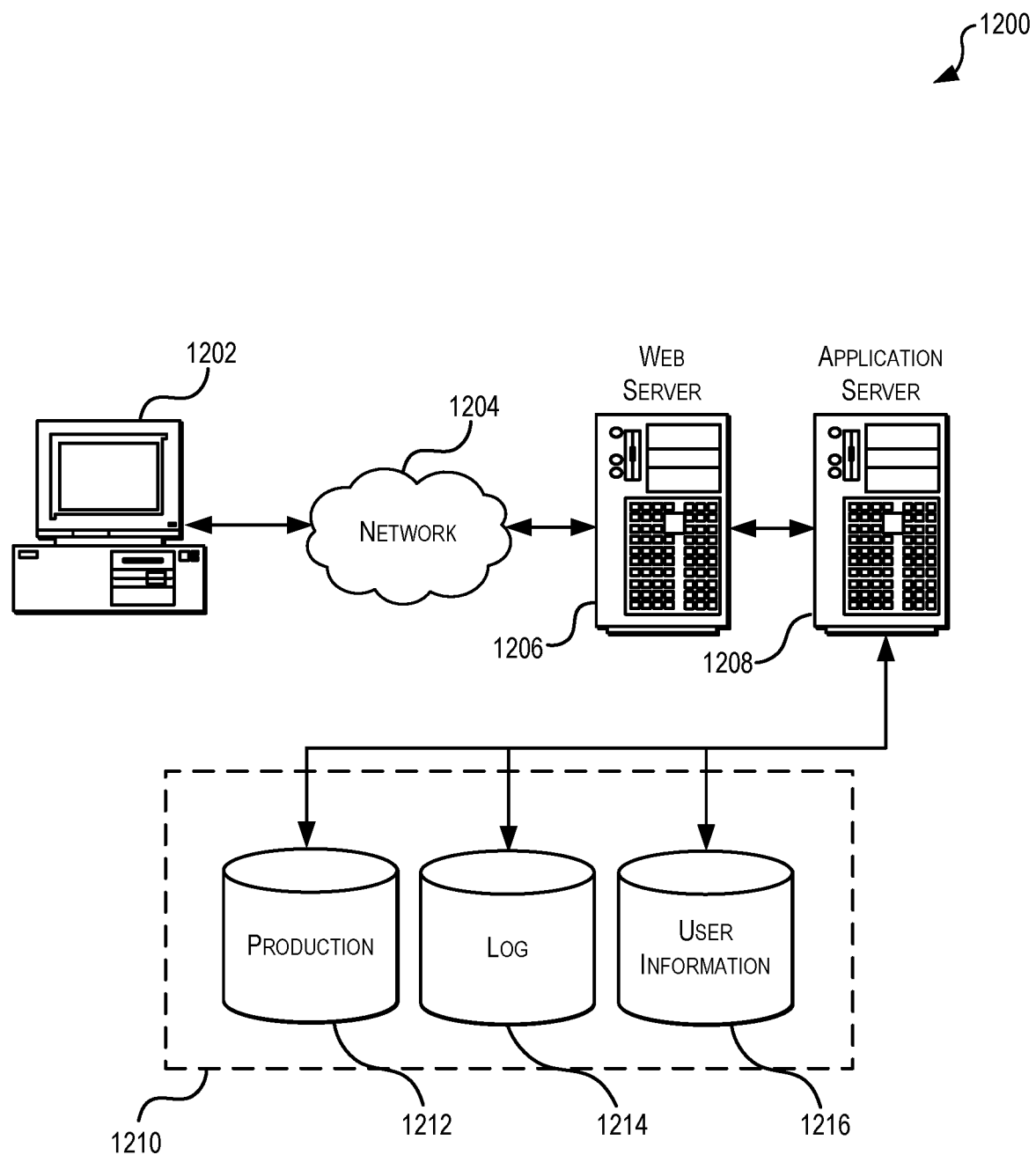
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk ("DVD"), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A vehicle, comprising:
   a frame;
   a propulsion system connected to the frame;
   an image capture device connected to the frame; and
   a computing device in communication with the propulsion system and the image capture device, and configured to at least:
     instruct the image capture device to capture an image of a scene while a light source is projecting a light;
     detect a reflection present in the image;
     determine that the scene comprises a transparent surface based at least in part on one or more of:
       detecting the reflection of the vehicle present in the image; or
       detecting that the light from the light source caused the reflection; and
     instruct the propulsion system to propel the vehicle based at least in part on the scene comprising the transparent surface.

2. The vehicle of claim 1, wherein the image capture device captures the image while the vehicle is moving towards the transparent surface.

3. The vehicle of claim 1, wherein the reflection comprises a specular reflection.

4. The vehicle of claim 1, wherein the reflection comprises a front end of the vehicle or a rear end of the vehicle.

5. The vehicle of claim 1, wherein:
the vehicle further comprises a braking system; and
the computing device is further configured to at least instruct the braking system to slow movement of the vehicle based at least in part on the scene comprising the transparent surface.

6. A vehicle, comprising:
a frame;
a propulsion system connected to the frame; and
a computing device in communication with the propulsion system, and configured to at least:
 access an image of a scene captured by an image capture device;
 detect a reflected image present in the image, the reflected image comprising at least a portion of the vehicle;
 determine that the scene comprises a transparent element based at least in part on identifying that the reflected image comprises the portion of the vehicle; and
 instruct the propulsion system to propel the vehicle in a manner that accounts for the transparent element.

7. The vehicle of claim 6, wherein the computing device is further configured to:
instruct a light source connected to the vehicle to project a light.

8. The vehicle of claim 7, wherein:
the image of the scene is a first image of the scene; and
the computing device is further configured to:
 access a second image of the scene captured by the image capture device at a second time while the light source is projecting the light; and
 determining that the scene comprises the transparent element is further based at least in part on:
  identifying that the light from the light source caused a specular reflection in the second image.

9. The vehicle of claim 8, wherein:
the light comprises at least one of a pattern or a pulse of light.

10. The vehicle of claim 6, wherein:
the vehicle further comprises a braking system; and
the computing device is further configured to instruct the braking system to slow movement of the vehicle based at least in part on the scene comprising the transparent element.

11. The vehicle of claim 6, wherein instructing the propulsion system of the vehicle to propel the vehicle comprises:
instructing the propulsion system of the vehicle to avoid the transparent element.

12. The vehicle of claim 6, wherein:
the computing device is further configured to instruct a light source connected to the frame to project a light; and
determining that the scene comprises the transparent element is further based at least in part on determining that the image contains a reflection of the light.

13. The vehicle of claim 12, wherein:
the light source is connected to a front end of the vehicle or a rear end of the vehicle; and
the portion of the vehicle in the reflected image comprises the reflection of the light and the front end of the vehicle or the reflection of the light and the rear end of the vehicle.

14. A vehicle, comprising;
a frame;
a propulsion system connected to the frame;
an image capture device connected to the frame;
a light source connected to the frame; and
a computing device in communication with the propulsion system, the image capture device, and the light source, the computing device configured to at least:
 instruct the light source to project a light;
 instruct the image capture device to capture an image of a scene while the light source is projecting the light;
 detect a specular reflection in the image;
 determine that the scene comprises a transparent surface based at least in part on detecting that the light from the light source caused the specular reflection; and
 instruct the propulsion system to propel the vehicle based at least in part on the transparent surface.

15. The vehicle of claim 14, wherein:
the image capture device captures the image while the vehicle is moving towards the transparent surface.

16. The vehicle of claim 14, wherein:
the specular reflection further comprises a front end of the vehicle or a rear end of the vehicle.

17. The vehicle of claim 14, wherein:
the light comprises at least one of a pattern or a pulse of light.

18. The vehicle of claim 14, wherein:
the vehicle further comprises a braking system; and
the computing device is further configured to at least instruct the braking system to slow movement of the vehicle based at least in part on the scene comprising the transparent surface.

19. The vehicle of claim 14, wherein instructing the propulsion system of the vehicle to propel the vehicle comprises:
instructing the propulsion system of the vehicle to avoid the transparent surface.

20. The vehicle of claim 14, wherein determining that the scene comprises the transparent surface is based at least in part on identifying a pattern in the image corresponding to an appearance of the vehicle.

* * * * *